No. 841,246.  
PATENTED JAN. 15, 1907.  
J. L. HARTNETT.  
WAGON RACK.  
APPLICATION FILED AUG. 20, 1906.

WITNESSES:

John L. Hartnett,
INVENTOR

By C. A. Snow & Co.
ATTORNEYS

UNITED STATES PATENT OFFICE.

JOHN L. HARTNETT, OF FABIUS, NEW YORK.

WAGON-RACK.

No. 841,246.　　　Specification of Letters Patent.　　　Patented Jan. 15, 1907.

Application filed August 20, 1906. Serial No. 331,337.

*To all whom it may concern:*

Be it known that I, JOHN L. HARTNETT, a citizen of the United States, residing at Fabius, in the county of Onondaga and State of New York, have invented a new and useful Wagon-Rack, of which the following is a specification.

This invention has relation to wagon-racks; and it consists in the novel construction and arrangement of its parts, as hereinafter shown and described.

The object of the invention is to provide a wagon-rack especially adapted for carrying hay and which is so constructed as to facilitate the unloading of the rack and which at the same time is of simple and durable construction.

The rack consists, primarily, of a base portion having a transversely-extending partition portion which is located between the ends of the base portion and is adapted to separate or divide one portion of the load carried by the rack from another portion, so that the hay may not become intermeshed or entangled, and consequently one portion or predetermined quantity of hay may be thrown off from the rack at any desired point, while the remainder of the load may be conveyed to another point. The said partition may be in a vertical position or in an inclined position, and thus the receiving-space for the quantity of hay to be separated may be increased or diminished to meet requirements.

Figure 1:
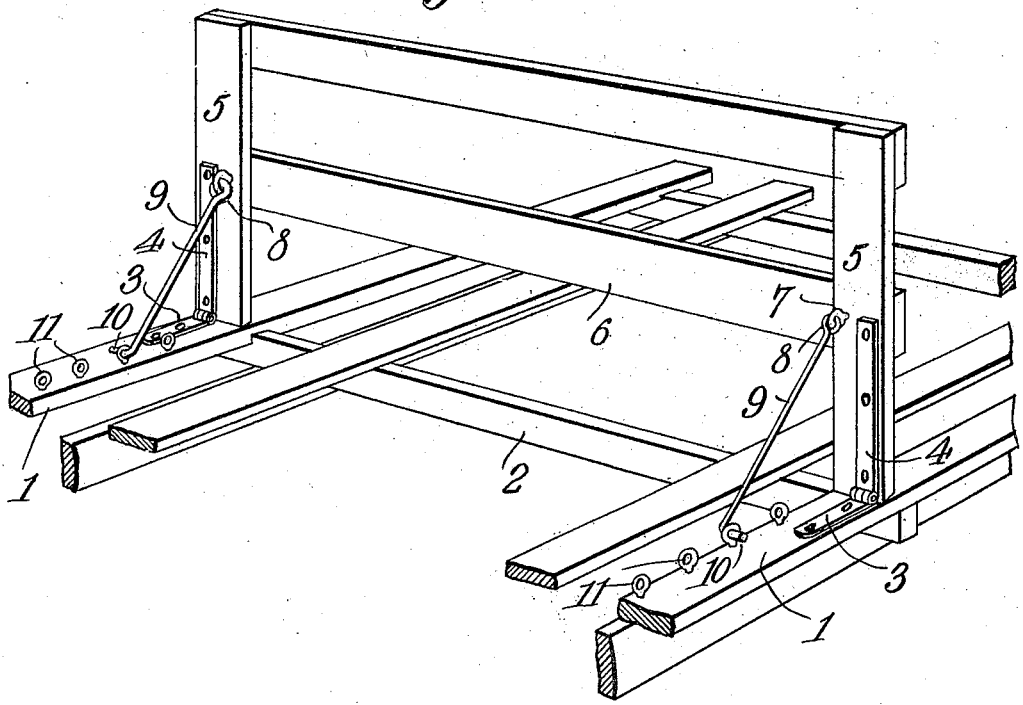
Figure 2:
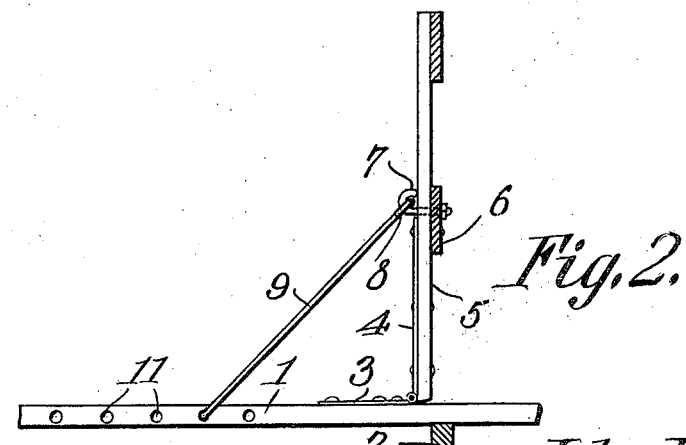

In the accompanying drawings, Figure 1 is a perspective view of an intermediate portion of the rack. Fig. 2 is a vertical sectional view of a modification of the same.

The rack consists of the parallel bars 1, which are secured together at points intermediate of their ends by the transversely-extending bar 2. The hinge members 3 are attached to the outer bars 1, and the hinge members 4 are attached to the uprights 5. The said members 3 are so positioned with relation to the cross-bar 2 that the uprights 5 are vertically above the said cross-bar 2 when the said uprights are swung in vertical positions. The cross-bars 6 connect the upper portions of the uprights 5 together, and the hooks 7 are attached to the said uprights. The eyes 8 receive the said hooks 7, and the opposite end of the rod 9 is provided with a hook 10, which extends in the same direction as the planes of the bars 1. The eyes 11 are located upon the outer bars 1 and are adapted to receive the hook 10 of the rod 9. In lieu of the eye 11 the said bar 1 may be provided with a series of perforations, any one of which may receive the hook 10 of the rod 9, and thus the uprights 5 may be pitched at an angle to the said bars 1.

Having described my invention, what I claim as new, and desire to secure by Letters Patent, is—

1. A wagon-rack comprising bars, a cross-bar securing said bars together, uprights hinged to said bars and being located over said cross-bar, and a rod pivoted to said uprights, and means for securing the same to adjust the angle of inclination of the uprights with relation to said bars.

2. A wagon-rack comprising bars, cross-bars securing said bars together, uprights hinged to said bars and being located over said cross-bar, a rod pivotally attached at one end to said uprights and having its opposite end fashioned into a hook, and means located upon said bar for retaining the end of said hook.

3. A wagon-rack comprising bars, a cross-bar securing said bars together, uprights hinged to said bars and being located over said cross-bar, a rod having at one end an eye, a hook located upon said upright and entering the eye of said rod, said rod having its opposite ends fashioned into a hook, and means located upon said bar for receiving the hooked end of said rod.

In testimony that I claim the foregoing as my own I have hereto affixed my signature in the presence of two witnesses.

JOHN L. HARTNETT.

Witnesses:
　IRENE E. HAMILTON,
　ANNIE B. HAMILTON.